3,004,830
METHOD OF PRODUCING METAL BORIDES
Nils Örne, 81 Banergatan, Stockholm, Sweden
No Drawing. Filed Aug. 22, 1955, Ser. No. 529,924
Claims priority, application Sweden Aug. 26, 1954
3 Claims. (Cl. 23—204)

This invention relates to a method of producing metal borides and relates particularly to a method of producing borides of heavy metals, intended for high temperature resisting materials in accordance with the following general formula:

$$MeO + B_2O_3 + C \rightarrow MeB + CO$$

According to a well-known method the charge is heated indirectly in a crucible suitable for the purpose, but in this way it is not possible to attain a sufficiently high temperature for melting the boride. Owing to this borides of the highest quality are not obtained by this method, as the reaction, as per what is stated above, does not go completely to the right, and besides, dehydrated boric acid must be used, which is much more expensive than common boric acid.

According to another well-known method the metal oxide and the boron trioxide ($B_2O_3$) are reduced by means of Al, Si or Mg alone or by adding carbon, whereby, owing to the nature of the process, products are obtained, which are of inferior quality.

Other methods of reduction are also known, but they are of little interest for technical production of high-grade borides.

The borides cannot be produced cheap according to these methods, as the latter first of all must be looked upon as laboratory methods, and because the heating must be followed by leaching in order to remove non-reduced oxides, but a certain percentage of carbon will always remain in the borides, whereby the quality will be impaired.

The object of this invention is to provide a method of producing borides of heavy metals and particularly borides of the transition metals, which borides have higher degree of purity, hardness, and quality.

Another object of the invention is to provide a method of producing borides of the heavy metals, and particularly borides of the transition metals, which borides are produced directly by a simplified process, that is, without leaching and other intermediate stages, the said procedure being cheaper than processes hitherto known, besides which it is possible to carry out the process on an industrial scale.

The invention is substantially characterized in that the charge which consists of metal oxide, boric acid, preferably common boric acid ($H_3BO_3$) and carbon, is smelted by the action of an electric arc. It is further characterized in that the smelting in the electric arc is carried out in such a manner that the carbon monoxide created protects the boride formed from being attacked by the oxygen and the nitrogen of the air. In such cases when common boric acid is used, the latter is dehydrated and water escapes and therefore the reaction in the carbon monoxide protected reaction zone close to the electric arc takes place between metal oxide, boric acid ($B_2O_3$) and carbon.

Through this borides of a very high quality are obtained, and as the temperature is so high that the boride is in molten state the above-mentioned reaction will go completely to the right, and the boride in question is obtained directly without subsequent treatment at the same time as the formation of boron carbides is avoided, as the metal borides are strictly defined compounds with a high melting point. The metal boride forms a homogeneous block under the electric arc.

Above all, borides of heavy metals may be advantageously produced in accordance with this invention, preferably borides of the transition metals, first of all borides of the group consisting of titanium, zirconium, chromium, manganese, molybdenum, tungsten, columbium (niobium), and tantalum. In many cases borides of zirconium, chromium and titanium are of most interest.

The invention is not restricted to be carried out in a single-phase furnace, but can advantageously be applied in furnaces with more than one electric arc.

In order to illustrate the invention an example of its application in one of the preferred embodiments will be hereinafter described.

*Example*

In an open electric arc furnace with suspended electrodes 30 parts by weight of $TiO_2$, 100 parts by weight of $H_3BO_3$, and 23 parts by weight of carbon were charged. The charging was carried out in such a manner that a cylindrical crater was formed by the charged material, into which the electrodes were lowered. The furnace was started and the following course took place, when the heat developed was absorbed by the charge.

(1) The temperature increased and the boric acid began to melt, and a vitrification of the crater wall took place. This vitrification had a very favourable effect so that the crater wall became stronger and prevented thereby the least trace of the charge from blowing away.

(2) When the temperature had increased still more, the dehydration of the boric acid took place.

(3) Upon still further increase of the temperature the reduction of the boron trioxide started at the same time as the reduction of the titanium dioxide. The carbon monoxide formed effected a superpressure in the crater whereby an effective protection against attack by the atmosphere was obtained.

(4) The course now was in a condition of continuation and the $TiB_2$ was collected in the form of a melt under the electrodes. Through the high melting point of the titanium boride, the said melt congealed from below and grew upwards in the form of a block, on the upper portion of which there was a shallow pool of titanium boride.

(5) When a sufficient amount of titanium boride had been formed, the effect was broken, and protective gas was introduced towards the bottom of the crater through a tube lowered down between the electrodes.

This protective gas was supplied during a short period until the temperature had decreased so much that there was no longer any attack by the air. When the furnace and the charge had cooled completely, the charge not converted into titanium boride which was to be found round the titanium boride block, was recovered. The block was ready for comminution.

The titanium boride obtained had the following composition: 70.1% Ti, 29.8% B, 0.31% C, traces of Fe and Si, the total being 100.21%.

On another occasion titanium boride was produced in the same way, and the following composition was obtained: 68.9% Ti, 31.1% B, 0.34% C, traces of Fe and Si, the total being 100.34%. The samples which were analyzed, were taken directly from the comminuted block without preceding leaching.

The formula $TiB_2$ corresponds to 68.89% Ti and 30.11% B.

The first of the as hitherto known methods is described in Ind. and Eng. Ch., volume 28, 1936, No. 7, pages 769–770. Production of zirconium boride is described. The boride obtained had the following composition: 78.55% Zr, 18.15% B, 1.89% C, and 0.03% Si. The analysis was probably preceded by acid leaching.

The formula $ZrB_2$ corresponds to 80.82% Zr and 19.18% B.

As will be seen, the impurity of carbon in the boride produced in accordance with this well-known process was more than 5 times greater than the impurity in the titanium boride produced in accordance with this invention.

At X-ray crystallographic test of a sample produced in accordance with this invention and consisting of $TiB_2$ the following values were obtained for the lattice parameters.

$$a = 3.044 \text{ A.}$$
$$c = 3.11 \text{ A.}$$

where the distances $a$ and $c$ are the numbers of Angstrom units between similar kinds of atoms. No X-ray lines, apart from those belonging to $TiB_2$, were discovered.

As a comparison it may be mentioned that the lattice parameters obtained on $TiB_2$ according to Acta Chemica Scandinavica 4, 1950, page 217 (Kiessling) are:

$$a = 3.028 \text{ A.}$$
$$c = 3.228 \text{ A.}$$

The same figures were to be found in "Metals Transactions," volume 185, October 1949, page 750.

A metallographic test was made on zirconium boride produced in accordance with this invention. At the preparation a process made particularly for zirconium boride, was applied, described in "Powder Metallurgy Bulletin," volume 6, No. 1, under the heading "A Method for the Metallographic Preparation of Zirconium Boride." On subjecting the sample to metallographic test through a microscope it appeared that the structure of the zirconium was in agreement with pictures of the structure of zirconium borides disclosed in the above-mentioned article.

The melting point of zirconium boride and titanium boride is stated in literature as 2990±50 centigrades. There is no difference in the production of the other borides, which are the subject matter of this application, and that titanium oxide has been used is only due to the fact that this oxide was easiest to the inventor to procure at the time of the experiments.

The great value of the invention is that the method can be applied on a large scale and that products obtained are of high purity due to the fact that they crystallize from a liquid phase.

The invention is not restricted to the example shown but may be varied within the scope of the claims.

Having now described my invention, what I claim as new and desire to secure by Letters Patent is:

1. Method of producing borides of transition metals selected from the group consisting of titanium, zirconium, chromium, manganese, molybdenum, tungsten, columbium and tantalum, by forming into a vertical electric arc furnace container a cup shaped charge of an intimate mixture of finely comminuted components comprising an oxide of at least one of said transition metals, a boric acid component, and carbon, said cup shaped charge providing a central cavity for introducing vertically within said cavity electrode means for electric arc generation above the bottom and within the space said cup shaped charge provides, igniting an electric arc, between said electrode means to melt the boric acid component and to vitrify the wall of said cavity and to dehydrate the boric acid, increasing the energy of the electric arc to start and maintain the reduction of the boric acid and the transition metal components by said carbon component with the formation of carbon monoxide, the composition of said mixture being such that a protective monoxide atmosphere of superpressure is maintained in said cavity, and smelting by means of said generated electric arc a successively increasing boride lump of said reduced metal component into the bottom of said cavity.

2. Method as claimed in claim 1 in which the brim only of said cup shaped charge is continuously supplied with additional amounts of said mixture as the melting process proceeds in order to provide a continuous production of said borides.

3. Method as claimed in claim 1 in which the boric acid component so utilized is commercial hydrous boric acid.

References Cited in the file of this patent

UNITED STATES PATENTS

| | | |
|---|---|---|
| 324,658 | Cowles et al. | Aug. 18, 1885 |
| 2,285,837 | Ridgway | June 9, 1942 |

OTHER REFERENCES

Final Report on a Study of Selected Metallic Borides, Nitrides and Phosphides, by R. W. F. Morel et al., published Mar. 4, 1954, page 22.

Norton et al.: "Journal of Metals," vol. 1, pp. 749–751 (October 1949).

Kieffer et al.: "Zeitschrift für Anorgansiche und Allgemeine Chemie," vol. 268, No. 3, May 1952, p. 193.